United States Patent [19]

Babarin

[11] Patent Number: 4,936,501
[45] Date of Patent: Jun. 26, 1990

[54] SOLDERING DEVICE

[76] Inventor: Sergei Babarin, 21-57 Hollland Ave. #L, Bronx, N.Y. 10462

[21] Appl. No.: 337,646

[22] Filed: Apr. 13, 1989

[51] Int. Cl.⁵ .............................................. B23K 3/06
[52] U.S. Cl. ...................................... 228/53; 219/230
[58] Field of Search .............................. 228/51, 53, 52; 219/230

[56] References Cited

U.S. PATENT DOCUMENTS 2,447,110  8/1948  Bitzenburger ....................... 228/52
2,458,319  1/1949  Uhing ................................... 228/53
3,146,747  9/1964  Stebbing, Jr. ........................ 228/53
4,773,582  9/1988  Vella .................................. 219/230

Primary Examiner—Kenneth J. Ramsey
Attorney, Agent, or Firm—Ilya Zborovsky

[57] ABSTRACT

A soldering device has a container for accommodating solder bodies, a soldering head, a tubular guide for guiding the solder bodies to the soldering head, and a slider formed to take the solder bodies from the container and transfer them into the tubular guide.

8 Claims, 1 Drawing Sheet

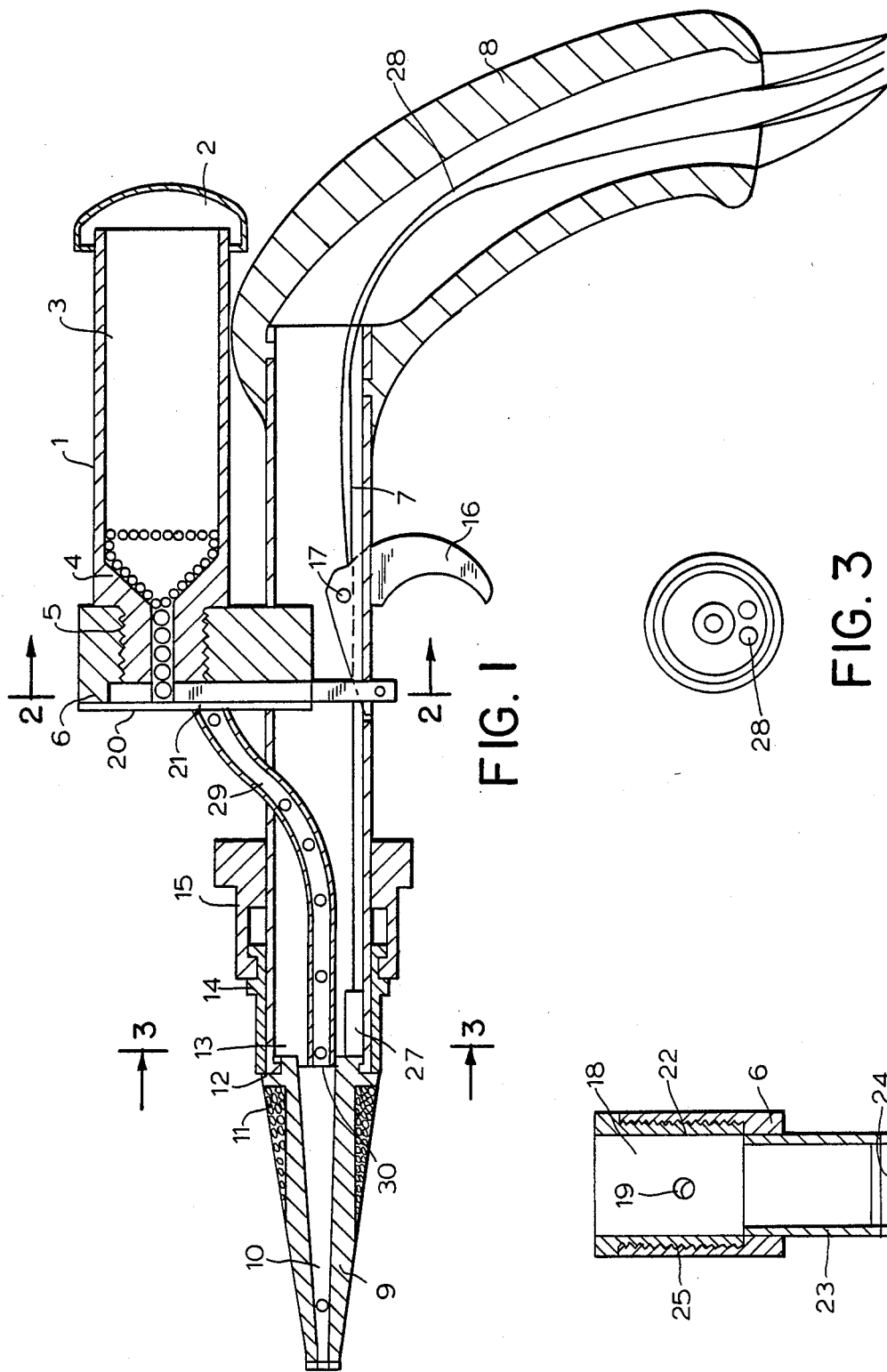
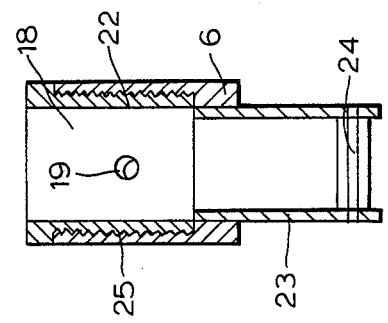

SOLDERING DEVICE

BACKGROUND OF THE INVENTION

The present invention relates to a soldering device.

Soldering devices are widely known and used in various modifications. Their constructions are relatively complicated especially when used with discrete soldering bodies to be supplied to the solder zone. It is believed to the desirable to improve further the existing soldering devices of this type.

SUMMARY OF THE INVENTION

Accordingly, it is an object of the present invention to provide a soldering device which is a further improvement of the devices of this type.

In keeping with these objects and with others which will become apparent hereinafter, one feature of the present invention resides, briefly stated, in a soldering device which has a container for accommodating a plurality of solder bodies, a tubular guide communicating with a soldering head, and a slider movable between an outlet of the container to the inlet of the tubular guide to transfer the solder bodies from the former to the latter.

The novel features of the present invention are set forth in particular in the appended claims. The invention itself, however, both as to its construction and its manner of operation will be best understood from the following description of a preferred embodiment which is accompanied by the following drawings.

BRIEF DESCRIPTION OF THE DRAWINGS

FIG. 1 is a side view of a soldering device in accordance with the present invention; and FIGS. 2 and 3 are views showing sections taken along the lines II—II and III—III in FIG. 1.

DESCRIPTION OF A PREFERRED EMBODIMENT

A soldering device in accordance with the present invention has a container 1 with an open end closeable by a removable cover 2. The interior of the container has a cylindrical part 3, a conical part 4 and a short passage 5 communicating with one another. The front part of the container 1 is screwed into a holder 6 which is mounted on a tubular support 7 for example by welding. A plastic handle 8 is connected with the rear end of the support 7.

The device further has a soldering head 9 with a supply passage 10 narrowing toward its front end. The rear end of the soldering head has an engaging formation 11 which engages with an engaging formation 12 on the front end of the tubular support 7. The front end of the tubular support 7 has a removable segment 13. A bush 14 slides over the front end and over the segment 13. The rear end of the bush 14 engages with a knob 15 rotatably relative to the latter. The knob is turnable on the tubular support 7 and displaceable along the latter via threads provided on the inner surface of the knob and the outer surface of the tubular support.

A cock 16 is pivotally mounted on the tubular support 7 by a pivot pin 17. A slider 18 has a receiving opening 19 and moves in a guide of the holder 6. Its opposite side is covered by a plate 20 having an opening 21. The slider has a solid part 22 and a hollow part formed by two strips 23 connected by a pin 24. The front end of the cock 16 engages the pin 24. Two springs 25 are connected by first ends to a shoulder of the slider 18 and by second ends to the holder 6 to normally pull the slider upwardly in the drawings. Electrical conductors 26 extend through the interior of the tubular support 7 and end in a plug 27 provided with two prongs 28. The prongs 28 are insertable in not shown plug holes in the soldering head 9 to form plug-socket means.

The soldering device operates in the following manner. The conductors 26 are connected with the electrical source and the soldering head is heated. The device is turned by 90° vertically so that the front end of the soldering head faces downwardly. A solder body moves into the passage 5 of the container and from there into the opening 19 of the slider 18. A user pulls the cock 16 and turns its end counterclockwise so that the front end pulls the slider away of the passage 5 and to the guide 29 which extends from the opening 21 of the plate 20 to the inlet 30 of the soldering head. When the opening 19 of the slider coincides with the inlet of the guide 29, the solder body slides through the guide into the passage 10 and is melted there under the action of heat of the heated soldering head. Then the melted solder flows out of the head onto a required spot. When the user releases the cock, the springs 25 return the slider to its initial position. The process is then repeated as many times as desired.

For removing the soldering head, the knob 15 is turned and therefore displaced axially rearwardly over the tubular support away from the soldering head. The knob displaces the bush 14 axially rearwardly away of the region of the segment 13, the segment is removed radially, and then the rear end of the soldering head is removed radially through a recess in the tubular support, which recess is formed after the removal of the segment. The installation of the soldering head is performed in a reversed order.

The present invention are not limited to the details shown since various modifications and structural changes are possible without departing in any way from the spirit of the invention.

What is desired to be protected by Letters Patent is set forth in the appended claims.

1. A soldering device, comprising
 a container arranged to accommodate a plurality of solder bodies and having an outlet;
 a soldering head having a passage provided with a passage inlet and a passage outlet;
 a tubular guide having a first end located in the region of said container outlet and a second end communicating with said passage inlet of said soldering head;
 a slider movable between a first position in which it takes one of the solder bodies from said container outlet and a second position in which it places the taken solder body to the region of said passage inlet to introduce the same into said passage;
 a cock arranged to move said slider from said first position to said second position;
 return spring means arranged to return said slider from said second position to said first position upon release of said cock by a user, wherein said slider having an opening with a size substantially corresponding to a size of one solder body and formed to receive one solder body when said slider is in said first position and hold the one solder body during the movement of said slider to said second position.

2. A soldering device, comprising a container arranged to accommodate a plurality of solder bodies and having an outlet;

a soldering head having a passage provided with a passage inlet and a passage outlet;

a tubular guide having a first end located in the region of said container outlet and a second end communicating with said passage inlet of said soldering head;

a slider movable between a first position in which it takes one of the solder bodies from said container outlet and a second position in which it places the taken solder body to the region of said passage inlet to introduce the same into said passage;

a cock arranged to move said slider from said first position to said second position;

return spring means arranged to return said slider from said second position to said first position upon release of said cock by a user, wherein said slider having a solid portion provided with said opening and another part composed of two narrow parallel strips having free ends, said slider further having a transverse pin connecting said free ends of said strips with one another, said cock having an engaging end which engages said transverse pin of said slider to move the latter from said first position to said second position.

3. A soldering device, comprising a container arranged to accommodate a plurality of solder bodies and having an outlet;

a soldering head having a passage provided with a passage inlet and a passage outlet;

a tubular guide having a first end located in the region of said container outlet and a second end communicating with said passage inlet of said soldering head;

a slider movable between a first position in which it takes one of the solder bodies from said container outlet and a second position in which it places the taken solder body to the region of said passage inlet to introduce the same into said passage;

a cock arranged to move said slider from said first position to said second position;

return spring means arranged to return said slider from said second position to said first position upon release of said cock by a user;

a handle;

a tubular support having an axis and one end releasably connected with said soldering head and another end connected with said handle;

means for releasably connecting said one end of said tubular support with said soldering head, said connecting means including a removable segment provided in a wall of said tubular support in the region of said one end; and a bush axially movable on said one end of said tubular support between one position in which it is located over said segment and holds said segment in engagement with a remaining part of said tubular support so as to hold said soldering head in said one end of the latter, and another position in which said bush is displaced away of said segment so that said segment can be removed radially by a user and said soldering head can then be removed radially from said one end of said support through an opening in the wall of said tubular support formed after the removal of said segment.

4. A soldering device as defined in claim 3, and further comprising a displacing knob connected with said bush and having an inner thread, said tubular support having an outer thread on which said inner thread of said knob engages so that when said knob is turned by a user it displaces along said tubular support and displaces said bush between said one and other positions.

5. A soldering device as defined in claim 1, and further comprising a tubular support having one end releasably connected with said soldering head, and another end; a handle connected with the other end of said tubular support, said cock being pivotably supported on said tubular support; and electrical conductors extending through said tubular support.

6. A soldering device as defined in claim 5, wherein said electrical conductors have ends releasably connectable with said soldering head; and further comprising means for releasably connecting said ends of said electrical conductors with said soldering head and formed as plug-socket means.

7. A soldering device as defined in claim 1, wherein said container has a cylindrical part and a conical part extending from said cylindrical part toward said container outlet, said container also having a short passage extending between said conical part and said outlet of said container for guiding the solder bodies from the interior of said container to said container outlet.

8. A soldering device as defined in claim 7, wherein said container has a first end provided with said short passage and an opposite end which is open; and further comprising a removable cover arranged to close said open end of said container during use and to open said open end for supplying solder bodies into the interior of said container.

* * * * *